(12) United States Patent
Bin et al.

(10) Patent No.: US 12,235,737 B1
(45) Date of Patent: Feb. 25, 2025

(54) SYSTEM, METHOD, AND COMPUTER PROGRAM FOR MAKING DATA RESTORABLE TO A CLOUD-BASED APPLICATION

(71) Applicant: Odaseva Technologies SAS, Neuilly-sur-seine (FR)

(72) Inventors: Sovane Bin, San Francisco, CA (US); Saddek Dekoum, Ris Orangis (FR); Raphaël Fonrouge, Chatenay Malabry (FR); Francois Lopitaux, San Carlos, CA (US); Arnaud Deronne, Castelnau le Iez (FR)

(73) Assignee: Odaseva Technologies SAS, Neuilly-sur-seine (FR)

( * ) Notice: Subject to any disclaimer, the term of this patent is extended or adjusted under 35 U.S.C. 154(b) by 412 days.

(21) Appl. No.: 17/591,283

(22) Filed: Feb. 2, 2022

(51) Int. Cl.
  *G06F 11/14* (2006.01)
  *G06F 11/34* (2006.01)

(52) U.S. Cl.
  CPC ...... *G06F 11/1469* (2013.01); *G06F 11/1451* (2013.01); *G06F 11/1464* (2013.01); *G06F 11/3457* (2013.01)

(58) Field of Classification Search
  CPC .. G06F 11/14; G06F 11/1469; G06F 11/1451; G06F 11/1464; G06F 11/3457
  See application file for complete search history.

(56) References Cited

U.S. PATENT DOCUMENTS

| | | | |
|---|---|---|---|
| 6,642,946 B1 | 11/2003 | Janes et al. | |
| 8,255,320 B1 | 8/2012 | Seal et al. | |
| 9,268,587 B2 | 2/2016 | Kruglick | |
| 9,330,301 B1* | 5/2016 | Ozog | G06V 20/20 |
| 9,769,131 B1 | 9/2017 | Hartley et al. | |
| 10,664,494 B2* | 5/2020 | Ding | G06F 16/178 |
| 11,055,123 B1 | 7/2021 | Bin et al. | |
| 11,609,774 B2 | 3/2023 | Bin et al. | |
| 2008/0049942 A1 | 2/2008 | Sprunk et al. | |
| 2012/0117558 A1 | 5/2012 | Futty et al. | |
| 2012/0324242 A1 | 12/2012 | Kirsch | |

(Continued)

FOREIGN PATENT DOCUMENTS

WO  2022081408  4/2022

*Primary Examiner* — Kamini B Patel
(74) *Attorney, Agent, or Firm* — Lessani Law Group, PC

(57) ABSTRACT

The present disclosure relates to a system, method, and computer program for restoring extracted data to a cloud-based application. The system extracts a copy of data associated with a cloud-based application. The system provides a user interface that enables a user to enter a restoration flow for restoring the extracted data to the cloud-based application, where the restoration flow includes one or more routines for execution. The system receives a restoration flow comprising a pre-restoration routine and a restoration routine, where the pre-restoration routine specifies one or more data transformations to render the extracted data compatible with a restoration to the cloud-based application. The system executes the pre-restoration routine to transform the extracted data to be compatible with a restoration to the cloud-based application. The system executes the restoration routine to restore the transformed data to the cloud-based application. In certain embodiments, the restoration flow also includes a post-restoration routine.

17 Claims, 7 Drawing Sheets

(56) References Cited

U.S. PATENT DOCUMENTS

| | | | |
|---|---|---|---|
| 2013/0227703 A1* | 8/2013 | Sotos | G06F 21/78 726/26 |
| 2013/0283060 A1 | 10/2013 | Kulkarni et al. | |
| 2013/0297769 A1 | 11/2013 | Chang et al. | |
| 2014/0040182 A1 | 2/2014 | Gilder et al. | |
| 2014/0040196 A1* | 2/2014 | Wijayaratne | G06F 16/11 707/624 |
| 2014/0040197 A1* | 2/2014 | Wijayaratne | G06F 16/11 707/625 |
| 2014/0101438 A1 | 4/2014 | Elovici et al. | |
| 2014/0143661 A1 | 5/2014 | Carreno-Fuentes et al. | |
| 2014/0278534 A1 | 9/2014 | Romeo | |
| 2016/0019233 A1* | 1/2016 | Wijayaratne | H04L 67/1095 707/625 |
| 2016/0147999 A1 | 5/2016 | Fontanetta et al. | |
| 2016/0308855 A1 | 10/2016 | Lacey et al. | |
| 2017/0025040 A1 | 1/2017 | Maturana et al. | |
| 2017/0048252 A1 | 2/2017 | Straub et al. | |
| 2017/0091293 A1 | 3/2017 | Cummings et al. | |
| 2017/0249656 A1 | 8/2017 | Gantner et al. | |
| 2018/0081905 A1 | 3/2018 | Kamath et al. | |
| 2018/0089270 A1 | 3/2018 | Qiu et al. | |
| 2018/0150476 A1* | 5/2018 | Koos | G06F 16/11 |
| 2018/0176117 A1 | 6/2018 | Gudetee et al. | |
| 2019/0007206 A1 | 1/2019 | Surla et al. | |
| 2019/0034509 A1* | 1/2019 | Ding | G16H 40/67 |
| 2019/0042988 A1 | 2/2019 | Brown et al. | |
| 2019/0050925 A1 | 2/2019 | Hodge et al. | |
| 2020/0067772 A1 | 2/2020 | Tomkins et al. | |
| 2020/0073854 A1* | 3/2020 | Wijayaratne | G06F 16/16 |
| 2020/0082890 A1 | 3/2020 | Karr et al. | |
| 2020/0127937 A1 | 4/2020 | Busick et al. | |
| 2020/0159700 A1* | 5/2020 | Wijayaratne | G06F 16/11 |
| 2021/0049029 A1 | 2/2021 | Kumble et al. | |
| 2021/0067324 A1 | 3/2021 | Valente et al. | |
| 2021/0255991 A1* | 8/2021 | Koos | G06F 16/11 |
| 2021/0255992 A1* | 8/2021 | Wijayaratne | H04L 67/1095 |
| 2022/0067115 A1 | 3/2022 | Zheng et al. | |
| 2022/0107826 A1 | 4/2022 | Bin et al. | |
| 2022/0129804 A1 | 4/2022 | Dooley et al. | |
| 2022/0148084 A1 | 5/2022 | Baker | |
| 2022/0188334 A1 | 6/2022 | Chen | |
| 2022/0207489 A1 | 6/2022 | Gupta et al. | |
| 2023/0010219 A1 | 1/2023 | Howley et al. | |
| 2023/0082010 A1 | 3/2023 | Clifford et al. | |
| 2023/0145349 A1 | 5/2023 | Watari | |
| 2023/0315694 A1* | 10/2023 | Koos | G06F 16/178 707/625 |
| 2023/0325360 A1* | 10/2023 | Wijayaratne | H04L 67/1095 707/625 |

\* cited by examiner

FIG. 5C

SYSTEM, METHOD, AND COMPUTER PROGRAM FOR MAKING DATA RESTORABLE TO A CLOUD-BASED APPLICATION

BACKGROUND OF THE INVENTION

1. Field of the Invention

This invention relates generally to cloud-based applications and, more specifically, to a system and method for restoring extracted data to a cloud-based application.

2. Description of the Background Art

In the digital world we live in, it is essential for both corporate entities and individuals to have reliable, consistent backup system. One problem facing backup and restore systems, however, is the scenario in which a data model changes after extracting data from the backup system, such that the extracted data would be incompatible with a restoration to a cloud-based application. For example, a user may have added a new mandatory field to the extracted data or changed a field name such that the data model of the extracted data is no longer compatible with the original data model. Therefore, there is a need for a system and method to transform the extracted data to be compatible with a restoration to the cloud-based application and to execute a restoration routine to restore the transformed data to the cloud-based application. Similarly, there is a need for an efficient, user-friendly user interface for generating instructions for such a restoration flow.

SUMMARY OF THE DISCLOSURE

The present disclosure describes a system, method, and computer program for restoring extracted data to a cloud-based application. The method is performed by a computer system that includes servers, storage systems, networks, operating systems, and databases.

The present invention solves the technical problem of how to resolve compatibility issues between extracted data and a cloud-based application in order to restore the extracted data to the cloud-based application, especially for the scenario where the data model changed after the data was extracted from the cloud-based application. This solution makes use of a restoration flow entered by a user via a user interface, where the restoration flow may include one or more of a pre-restoration routine, a restoration routine, and a post-restoration routine. The system executes the pre-restoration routine to transform the extracted data to be compatible with the data model in the cloud-based application, followed by the restoration routine to restore the transformed data to the cloud-based application. If the restoration flow also includes a post-restoration routine, the system will then execute the post-restoration routine after the restoration routine to further transform the data restored to the cloud-based application.

In one embodiment, a method for restoring extracted data to a cloud-based application comprises the following steps:
- extracting a copy of data associated with a cloud-based application;
- providing a user interface that enables a user to enter a restoration flow for restoring the extracted data to the cloud-based application, wherein the restoration flow includes one or more routines for execution;
- receiving a restoration flow comprising a pre-restoration routine and a restoration routine, wherein the pre-restoration routine specifies one or more data transformations to render the extracted data compatible with a restoration to the cloud-based application;
- executing the pre-restoration routine to transform the extracted data to be compatible with a restoration to the cloud-based application; and
- executing the restoration routine to restore the transformed data to the cloud-based application.

BRIEF DESCRIPTION OF THE DRAWINGS

FIGS. 5A-5C are screenshots of an exemplary user interface, according to one embodiment, for a user creating a restoration flow.

DETAILED DESCRIPTION OF THE PREFERRED EMBODIMENTS

The present disclosure describes a system, method, and computer program for restoring extracted data to a cloud-based application. The method is performed by a computer system that includes servers, storage systems, networks, operating systems, and databases ("the system").

Example implementations of the method are described in more detail with respect to FIGS. 1-5C.

1. Method for Restoring Extracted Data to a Cloud-based Application

Figure 1:
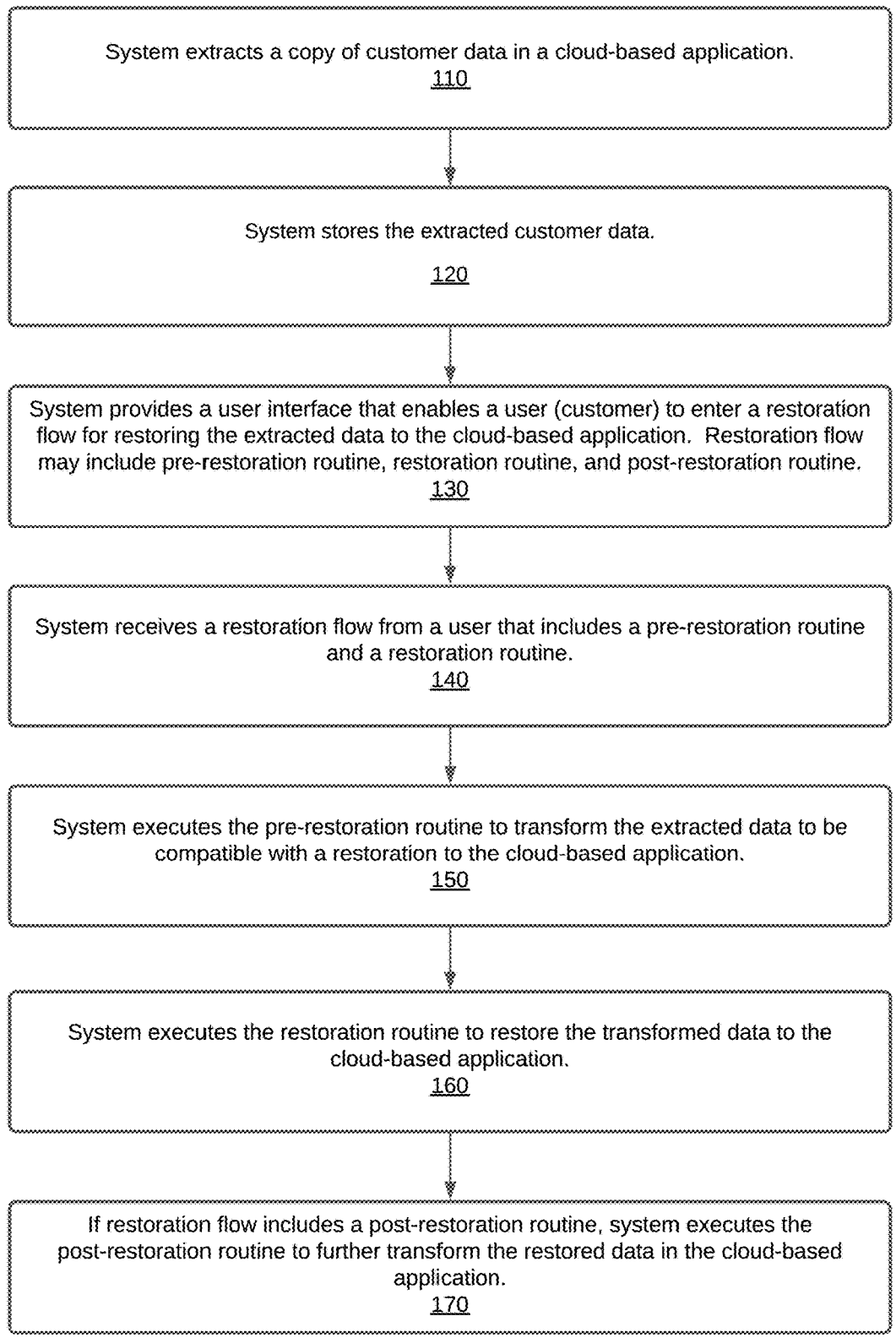
FIG. 1 is a flowchart that illustrates a method, according to one embodiment, for restoring extracted data to a cloud-based application.

FIG. 1 illustrates a method for restoring extracted data to a cloud-based application. The system extracts a copy of customer data in a cloud-based application (e.g., a SaaS application, such as SALESFORCE) (step 110). An example of a system that extracts data from a cloud-based database can be found in U.S. Pat. No. 11,055,123 B1, which is entitled "System, Method, and Computer Program for Providing an Ultra-High Availability Cloud Emulator in a Multi-tenant SaaS Environment Controlled by Another Party" and issued on Jul. 6, 2021, the contents of which have been incorporated by reference as if fully disclosed herein. In certain embodiments, after the extracting step, the system simulates a restoration (i.e., runs process, but does not complete process) to identify any issues associated with restoring the extracted data. The system stores the extracted customer data (step 120).

The system provides a user interface that enables a user (e.g., a customer) to enter a restoration flow for restoring the extracted data to the cloud-based application (step 130). A restoration flow is a set of ordered restoration routines. The set may include one or more routines, where the types of routines may include a pre-restoration routine, a restoration routine, and a post-restoration routine. The system receives a restoration flow from a user that includes a pre-restoration routine and a restoration routine (step 140). In one embodiment, providing a user interface for entering the restoration flow includes providing template code for pre-restoration and post-restoration routines. The pre-restoration routine specifies one or more data transformations to render the extracted data compatible with the restoration to the cloud-based application. The system executes the pre-restoration routine to transform the extracted data to be compatible with a restoration to the cloud-based application (step 150). The system executes the restoration routine to restore the transformed data to the cloud-based application (step 160).

In certain embodiments, the restoration flow also includes a post-restoration routine for making further transformations to the data after the restoration routine is executed. If the restoration flow includes a post-restoration routine, the system executes the post-restoration routine after the restoration routine to further transform the restored data in the cloud-based application (step 170). In certain embodiments, the post-restoration routine undoes the transformations made in the pre-restoration routine.

In certain embodiments, the data in the cloud-based application is associated with a data model that changed after the extracting step, and where the pre-restoration routine renders a corresponding data model for the extracted data compatible with the data model changes to the data in the cloud-based application. In certain embodiments, the extracted data includes metadata that defines the corresponding data model for the extracted data, and where transforming the extracted data in the pre-restoration routine comprises modifying said metadata. In certain embodiments, the data model changes include a new mandatory field, and the pre-restoration routine adds the new mandatory field to the corresponding data model for the extracted data. In certain embodiments, the data model changes include a field name change, and the pre-restoration routine makes the field name change to the corresponding data model for the extracted data. In certain embodiments, the data model changes include values that are no longer compatible, and the pre-restoration routine exchanges the values for compatible values in the corresponding data model for the extracted data.

In certain embodiments, a limitation to an API for the cloud-based application requires the extracted data to be altered prior to restoring the extracted data to the cloud-based application, and the pre-restoration routine alters the extracted data to be compatible with the API.

2. Example Use Case for Post-Backup Data Model Change

Figure 2:
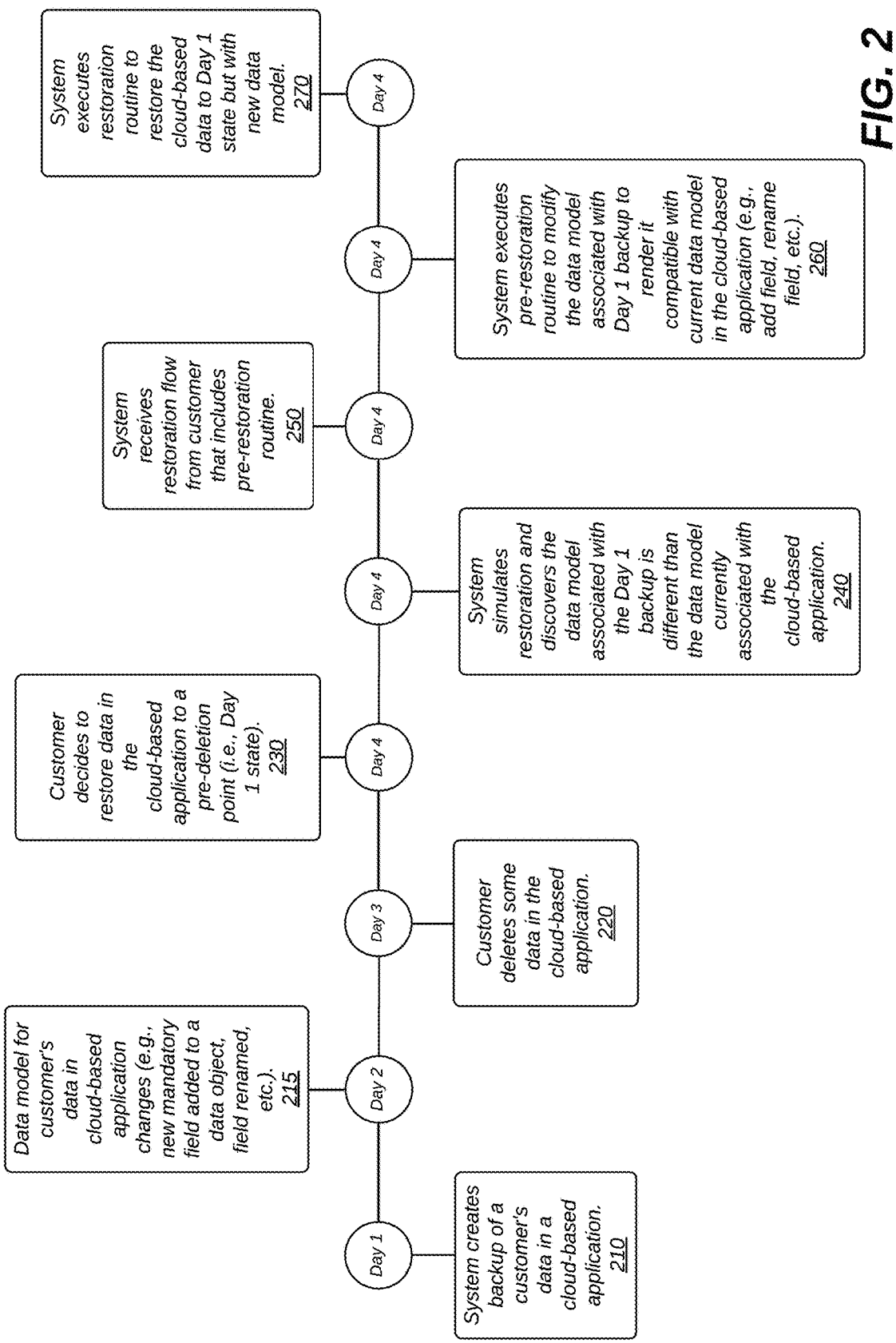
FIG. 2 is a flowchart that illustrates an example use case, according to one embodiment, related to a post-backup data model change.

FIG. 2 illustrates an example use case for a post-backup data model change. On Day 1, the system creates a backup of a customer's data in a cloud-based application (step 210). On Day 2, the data model for the customer's data in the cloud-based application changes (e.g., new mandatory field added to a data object, field renamed, etc.) (step 215). On Day 3, the customer deletes some data in the cloud-based application (step 220). On Day 4, the customer decides to restore data in the cloud-based application to a pre-deletion point (i.e., Day 1 state) (step 230). The system simulates restoration and discovers that the data model associated with the Day 1 backup is different than the data model currently associated with the cloud-based application (step 240). The system receives a restoration flow from the customer that includes a pre-restoration routine (step 250). The system executes the pre-restoration routine to modify the data model associated with the Day 1 backup to render it compatible with the current data model in the cloud-based application (e.g., add field, rename field, etc.) (step 260). The system executes the restoration routine to restore the cloud-based data to the Day 1 state but with the new data model (step 270).

3. Example Use Case for Backup Data Value State Incompatible with Restore API

Figure 3:
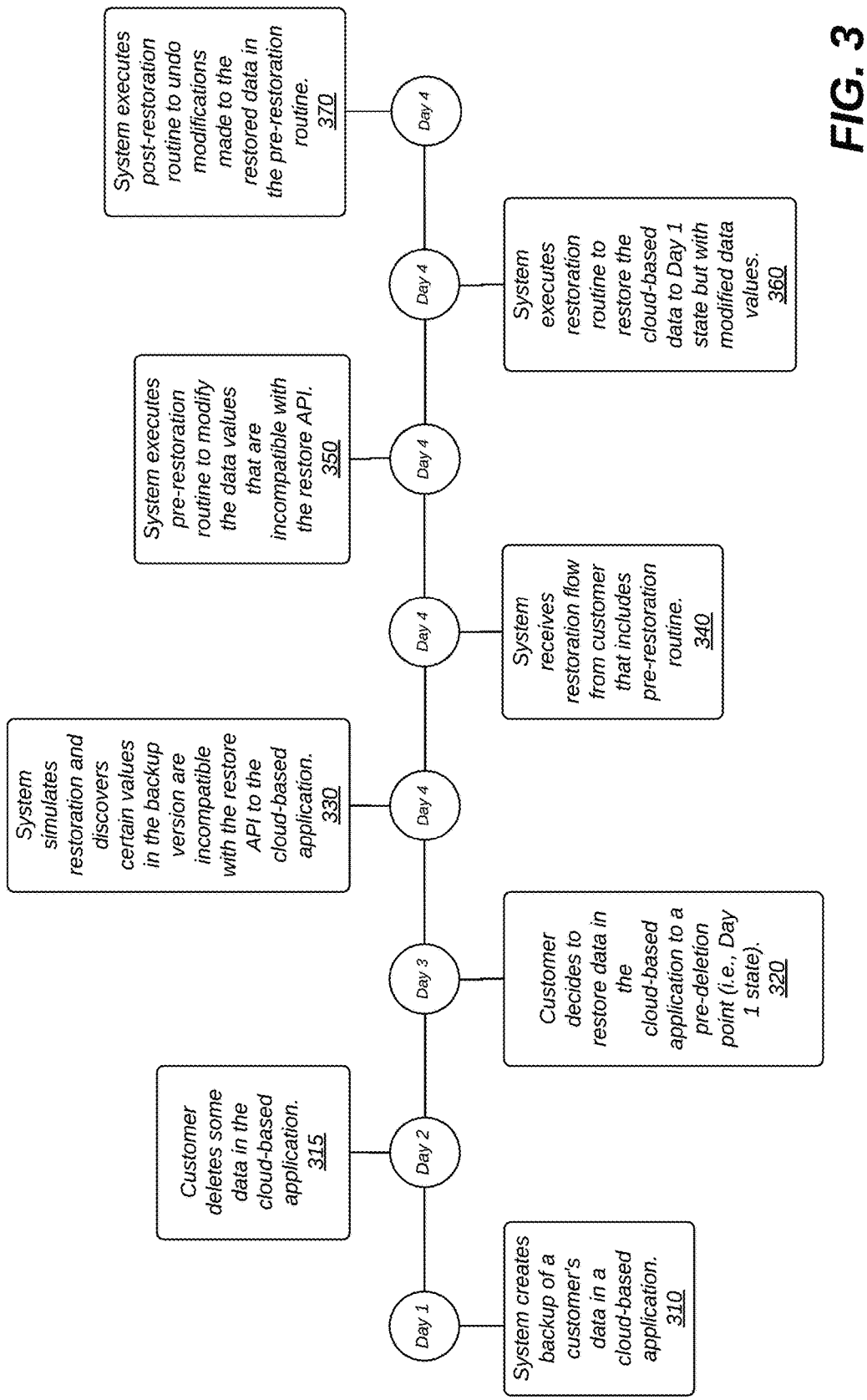
FIG. 3 is a flowchart that illustrates an example use case, according to one embodiment, related to a backup data value/state that is incompatible with a restore API.

FIG. 3 illustrates an example use case for a backup data value/state that is incompatible with a restore API. On Day 1, the system creates a backup of a customer's data in a cloud-based application (step 310). For example, the customer may be backing up an "Articles" data object that includes a "state" or "status" field with values, such as "draft," "published," etc. On Day 2, the customer deletes some data in the cloud-based application (step 315). On Day 3, the customer decides to restore the data in the cloud-based application to a pre-deletion point (i.e., Day 1 state) (step 320). On Day 4, the system simulates restoration and discovers certain values in the backup version are incompatible with the restore API to the cloud-based application (step 330). In the "Articles" example, the backup version includes "published" articles. The API to the cloud-based application does not allow Articles to be restored with the "published" value in the state/status field. The system receives a restoration flow from the customer that includes a pre-restoration routine (step 340). The system executes the pre-restoration routine to modify the data values that are incompatible with the restore API (step 350). In the "Articles" example, the system changes the "published" Articles to "draft" in the backup version (i.e., the value of the state/status field is modified for published articles). The system executes the restoration routine to restore the cloud-based data to the Day 1 state but with modified data values (step 360). The system executes the post-restoration routine to undo modifications made to the restored data in the pre-restoration routine (step 370). In the "Articles" example, the articles changed to "draft" in step 350 are changed back to "published" after the restore.

4. Example System Architecture

Figure 4:
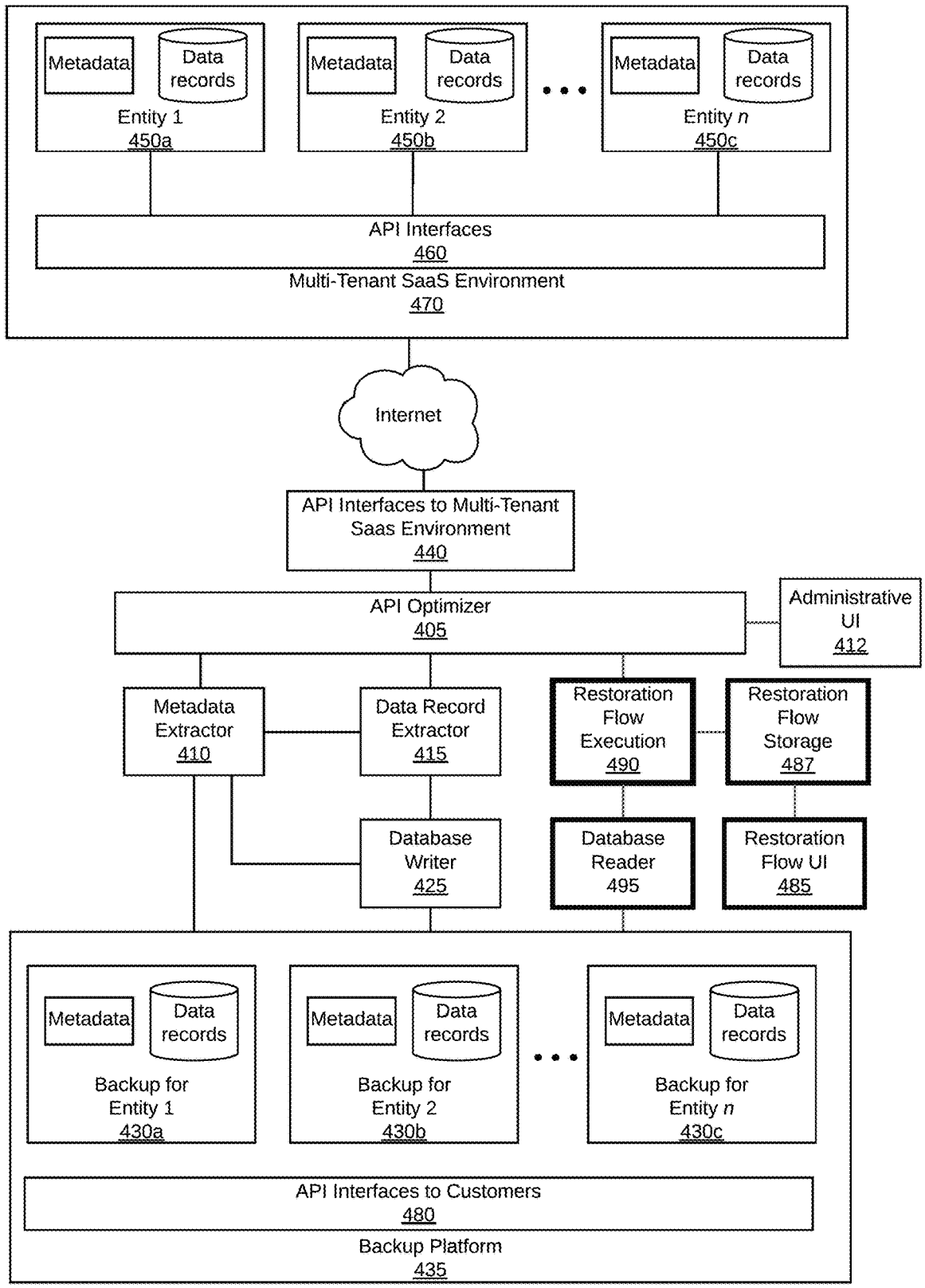
FIG. 4 is a block diagram that illustrates an example software architecture according to one embodiment.

FIG. 4 illustrates an example architecture for a system that performs the methods described herein. However, the methods described herein may be implemented in other systems and are not limited to the illustrated system. In order to obtain metadata and extract data records from a plurality of entities (e.g., Entity 1 to Entity n) in a multi-tenant SaaS environment 470 via the internet, one or more API interfaces 440 interfaces with the API interfaces 460 of the multi-tenant SaaS environment 470, an API optimizer 405 distributes API requests among a plurality of APIs and has a corresponding administrative user interface (UI) 412, a metadata extractor 410 extracts metadata, a data record extractor 415 extracts data records, and a database writer 425 writes to the database of the backup platform 435.

The backup platform 435 hosts a backup for each entity 430*a*, 430*b*, 430*c*. Each backup 430*a*, 430*b*, 430*c* includes the metadata and extracted data records that corresponds to the metadata and data records for each entity in the multi-tenant SaaS environment 450*a*, 450*b*, 450*c*. In one embodiment, both the multi-tenant SaaS environment 470 and the backup platform 435 do not provide a separate database for each entity. Hence, while the data records are illustrated separately using database symbols with respect to each entity in both the multi-tenant SaaS environment 470 and the backup platform 435, the database(s) is(are) often shared between entities on their respective servers. A customer can make API calls to the backup 430*a*, 430*b*, 430*c* via API interface 480.

The restoration flow UI 485 provides the user interface that enables a customer to enter the restoration flow process. The restoration flow storage 487 stores the restoration flow.

The restoration flow execution 490 executes the routines in the restoration flow. The database reader 495 reads data from the backup database(s).

Figure 5A:
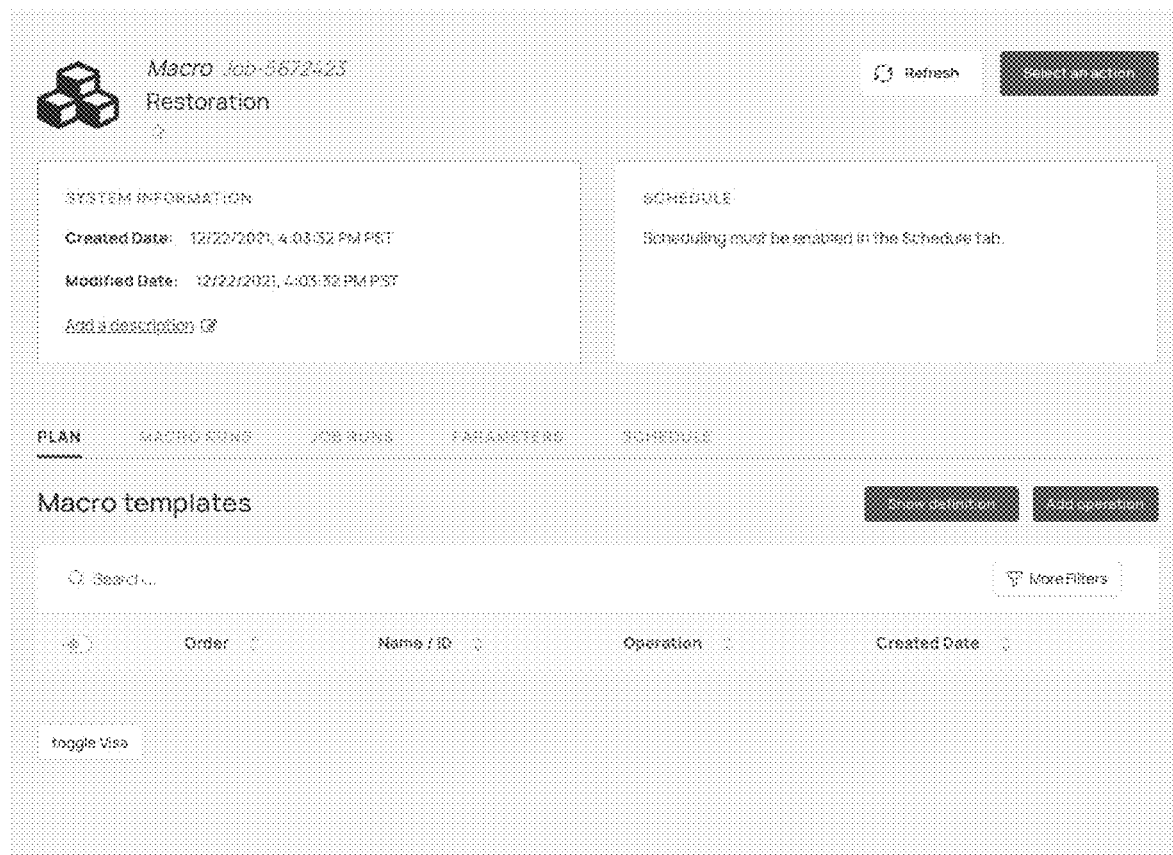
Figure 5B:
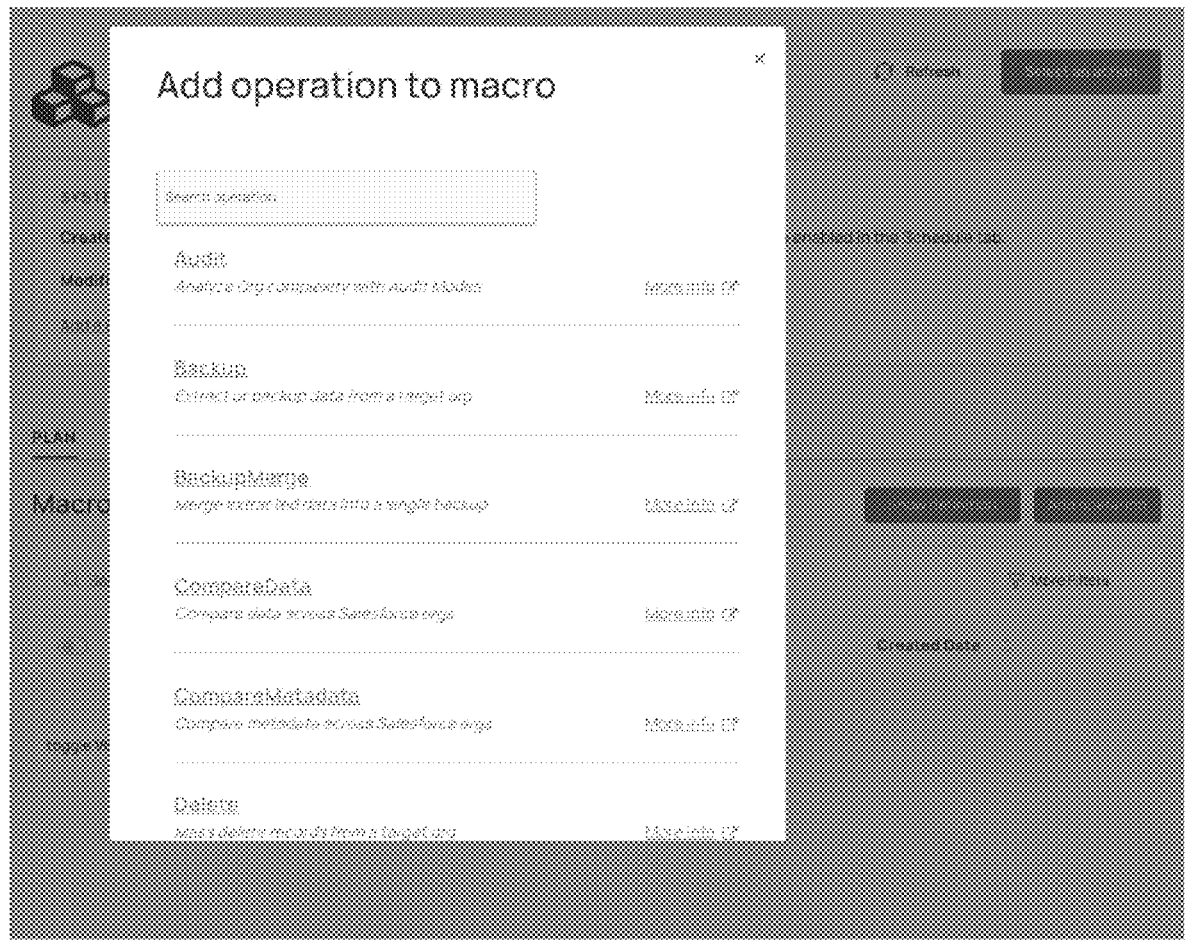
Figure 5C:
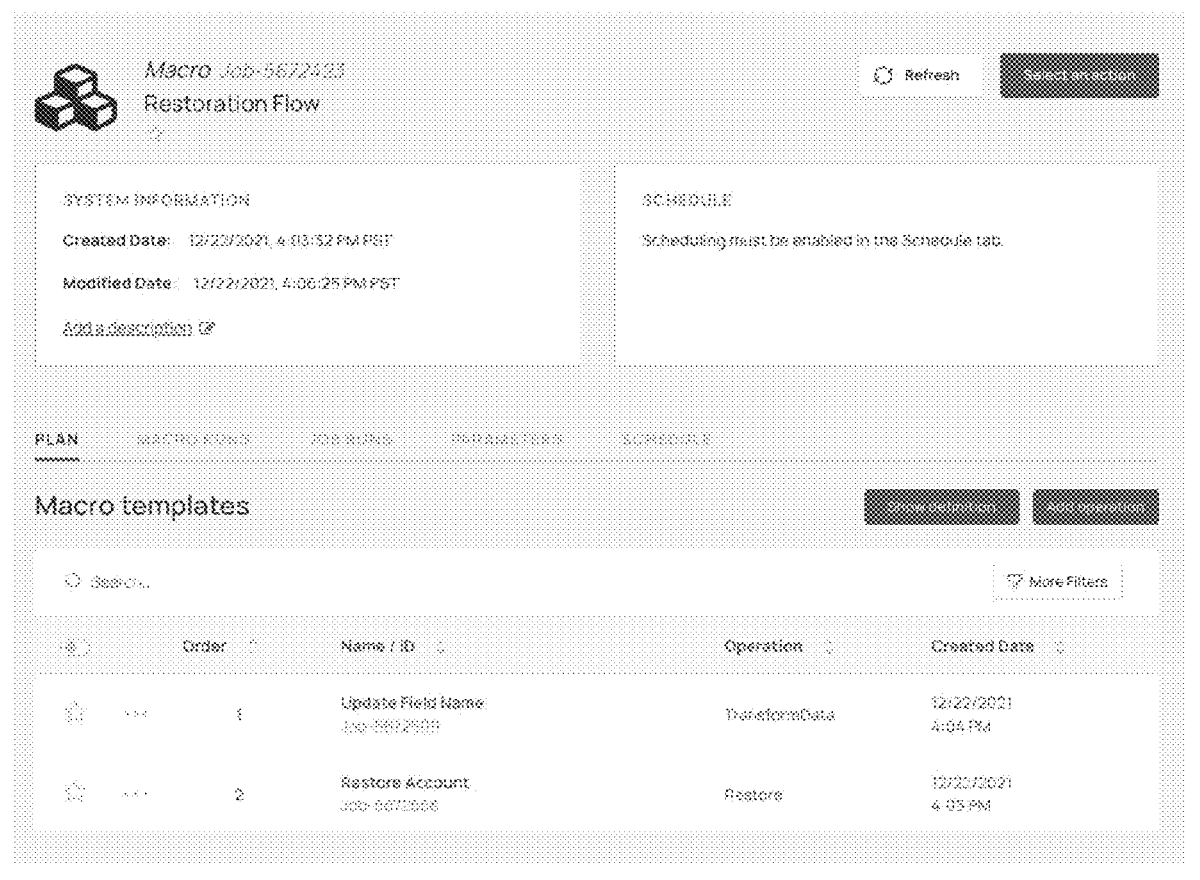

5. Example Screenshots of User Interface for a User Creating a Restoration Flow FIGS. 5A-5C illustrate screenshots of an exemplary user interface for a user creating a restoration flow according to the present invention. A person skilled in the art would understand that the present invention may be embodied in other user interfaces having more or less functionality within the scope of the present invention. As such, FIGS. 5A-5C is intended to be illustrative and not limiting in any way.

As seen in FIG. 5A, the user interface illustrates a macro restoration job created by a user on Dec. 22, 2021 at 4:03:32 PM PST. The user has options to further define the macro restoration job as seen in the five tabs: Plan, Macro Runs, Job Runs, Parameters, and Schedule. At this point, the user has yet to add any routines to the Plan tab and has not yet scheduled the execution of the macro restoration job in the Schedule tab. When the user selects the "Add operation" button, a pop-up window appears, as seen in FIG. 5B, providing the user with options for routines/operations to add to the Plan tab. In certain embodiments, selecting "Add operation" provides the user with templates for code that they can copy and paste and fill in appropriate values. As seen in FIG. 5C, the user has modified the macro restoration job on Dec. 22, 2021 at 4:06:25 PM PST with two routines/operations (i.e., Update Field Name and Restore Account) to run when the user schedules the macro restoration job to execute.

6. General

The methods described with respect to FIGS. 1-5C are embodied in software and performed by a computer system (comprising one or more computing devices) executing the software. A person skilled in the art would understand that a computer system has one or more memory units, disks, or other physical, computer-readable storage media for storing software instructions, as well as one or more processors for executing the software instructions.

As will be understood by those familiar with the art, the invention may be embodied in other specific forms without departing from the spirit or essential characteristics thereof. Accordingly, the above disclosure is intended to be illustrative, but not limiting, of the scope of the invention, which is set forth in the following claims.

The invention claimed is:

1. A method, performed by a computer system, for restoring extracted data to a cloud-based application, the method comprising:
   extracting a copy of data associated with a cloud-based application, wherein data in the cloud-based application is associated with a data model that changed after the extracting step;
   providing a user interface that enables a user to enter a restoration flow for restoring the extracted data to the cloud-based application, wherein the restoration flow includes one or more routines for execution;
   receiving a restoration flow comprising a pre-restoration routine and a restoration routine, wherein the pre-restoration routine specifies one or more data transformations to render the extracted data compatible with a restoration to the cloud-based application, wherein one of the one or more data transformations comprises rendering a corresponding data model for the extracted data compatible with the data model changes to the data in the cloud-based application;
   executing the pre-restoration routine to transform the extracted data to be compatible with a restoration to the cloud-based application; and
   executing the restoration routine to restore the transformed data to the cloud-based application.

2. The method of claim 1, wherein the extracted data includes metadata that defines the corresponding data model for the extracted data, and wherein transforming the extracted data in the pre-restoration routine comprises modifying said metadata.

3. The method of claim 1, wherein the data model changes include a new mandatory field, and the pre-restoration routine adds the new mandatory field to the corresponding data model for the extracted data.

4. The method of claim 1, wherein the data model changes include a field name change, and the pre-restoration routine makes the field name change to the corresponding data model for the extracted data.

5. The method of claim 1, wherein a limitation to an API for the cloud-based application requires the extracted data to be altered prior to restoring the extracted data to the cloud-based application, and wherein the pre-restoration routine alters the extracted data to be compatible with the API.

6. The method of claim 1, wherein the restoration flow also includes a post-restoration routine for making further transformations to the data after the restoration routine is executed.

7. The method of claim 6, further comprising:
   executing the post-restoration routine after the restoration routine to further transform the data restored to the cloud-based application.

8. The method of claim 7, wherein the post-restoration routine undoes the transformations made in the pre-restoration routine.

9. The method of claim 1, further comprising:
   after the extracting step, simulating a restoration to identify any issues associated with restoring the extracted data.

10. A non-transitory computer-readable medium comprising a computer program, that, when executed by a computer system, enables the computer system to perform the following steps for restoring extracted data to a cloud-based application, the steps comprising:
    extracting a copy of data associated with a cloud-based application, wherein data in the cloud-based application is associated with a data model that changed after the extracting step;
    providing a user interface that enables a user to enter a restoration flow for restoring the extracted data to the cloud-based application, wherein the restoration flow includes one or more routines for execution;
    receiving a restoration flow comprising a pre-restoration routine and a restoration routine, wherein the pre-restoration routine specifies one or more data transformations to render the extracted data compatible with a restoration to the cloud-based application, wherein one of the one or more data transformations comprises rendering a corresponding data model for the extracted data compatible with the data model changes to the data in the cloud-based application;
    executing the pre-restoration routine to transform the extracted data to be compatible with a restoration to the cloud-based application; and
    executing the restoration routine to restore the transformed data to the cloud-based application.

11. The non-transitory computer-readable medium of claim 10, wherein a limitation to an API for the cloud-based application requires the extracted data to be altered prior to restoring the extracted data to the cloud-based application, and wherein the pre-restoration routine alters the extracted data to be compatible with the API.

12. The non-transitory computer-readable medium of claim 10, wherein the restoration flow also includes a post-restoration routine for making further transformations to the data after the restoration routine is executed.

13. The non-transitory computer-readable medium of claim 10, further comprising:
   after the extracting step, simulating a restoration to identify any issues associated with restoring the extracted data.

14. A computer system for restoring extracted data to a cloud-based application, the system comprising:
   one or more processors;
   one or more memory units coupled to the one or more processors, wherein the one or more memory units store instructions that, when executed by the one or more processors, cause the system to perform the operations of:
      extracting a copy of data associated with a cloud-based application, wherein data in the cloud-based application is associated with a data model that changed after the extracting step;
      providing a user interface that enables a user to enter a restoration flow for restoring the extracted data to the cloud-based application, wherein the restoration flow includes one or more routines for execution;
      receiving a restoration flow comprising a pre-restoration routine and a restoration routine, wherein the pre-restoration routine specifies one or more data transformations to render the extracted data compatible with a restoration to the cloud-based application, wherein one of the one or more data transformations comprises rendering a corresponding data model for the extracted data compatible with the data model changes to the data in the cloud-based application;
      executing the pre-restoration routine to transform the extracted data to be compatible with a restoration to the cloud-based application; and
      executing the restoration routine to restore the transformed data to the cloud-based application.

15. The computer system of claim 14, wherein a limitation to an API for the cloud-based application requires the extracted data to be altered prior to restoring the extracted data to the cloud-based application, and wherein the pre-restoration routine alters the extracted data to be compatible with the API.

16. The computer system of claim 14, wherein the restoration flow also includes a post-restoration routine for making further transformations to the data after the restoration routine is executed.

17. The computer system of claim 14, further comprising:
   after the extracting step, simulating a restoration to identify any issues associated with restoring the extracted data.

\* \* \* \* \*